(12) United States Patent
Pantsu et al.

(10) Patent No.: US 7,627,769 B2
(45) Date of Patent: Dec. 1, 2009

(54) ELECTRONIC DEVICE AND METHOD FOR MANAGING POWER DISTRIBUTION THEREIN

(75) Inventors: Aki Pantsu, Orivesi (FI); Petri Vuori, Salo (FI)

(73) Assignee: Nokia Corporation, Espoo (FI)

( * ) Notice: Subject to any disclaimer, the term of this patent is extended or adjusted under 35 U.S.C. 154(b) by 901 days.

(21) Appl. No.: 10/865,200

(22) Filed: Jun. 10, 2004

(65) Prior Publication Data

US 2005/0276005 A1    Dec. 15, 2005

(51) Int. Cl.
*G06F 1/26* (2006.01)
(52) U.S. Cl. .................... 713/300; 713/340
(58) Field of Classification Search ........... 713/300, 713/310, 340
See application file for complete search history.

(56) References Cited

U.S. PATENT DOCUMENTS

| | | | |
|---|---|---|---|
| 6,859,365 B2 * | 2/2005 | Koiwa et al. | 361/687 |
| 7,065,658 B1 * | 6/2006 | Baraban et al. | 713/300 |
| 2003/0003972 A1 | 1/2003 | Sabat | |
| 2003/0040344 A1 * | 2/2003 | Shteyn et al. | 455/573 |

* cited by examiner

*Primary Examiner*—Thomas Lee
*Assistant Examiner*—Paul B Yanchus, III
(74) *Attorney, Agent, or Firm*—Hollingsworth & Funk, LLC

(57) ABSTRACT

An electronic device comprising at least a first part of a housing and a second part of a housing joined together with a fixing element and configured to be movable with respect to each other, wherein the first part of a housing comprises a first battery configured to provide power to functional elements comprised by the first part of a housing, and the second part of a housing comprises at least a second battery configured to provide power to functional elements comprised by the second part of a housing, and a method for managing power distribution in the electronic device.

14 Claims, 2 Drawing Sheets

ELECTRONIC DEVICE AND METHOD FOR MANAGING POWER DISTRIBUTION THEREIN

FIELD OF THE INVENTION

The invention relates to an electronic device comprising at least a first part of a housing and a second part of a housing joined together with a fixing element and configured to be movable with respect to each other, wherein said first part of a housing comprises a first battery configured to provide power to functional elements comprised by the first part of a housing, and especially to an electronic device in which the second part of a housing comprises at least a second battery configured to provide power to functional elements comprised by the second part of a housing.

BACKGROUND OF THE INVENTION

Electronic devices, such as multiple-part mobile phones and communicators, typically comprise a battery in the part of a housing of the device, which comprises the main part of the functional elements, such as a central processing unit, memories and input and charging means. However, a display element, for example, is usually located in another part of the housing of the device. Thus, power has to be transferred, for example, with a flex and a coaxial cable over a fixing element, such as a hinge joint or a slide mechanism, from the part of a housing, which comprises the battery to the part of a housing, which comprises the display element.

There are several problems with these kinds of devices. For example, the devices are difficult and expensive to manufacture, because the complicated fixing elements with electronic connectors and a large battery limit the layout of the device. Additionally, the battery generates heat while operating, and if the battery is large the heat cannot be removed very effectively. Furthermore, because the number of components necessary for carrying out the transfer of power is large and wires are long, there is additional power consumption in the device. The expensive flex, filters and large capacitors in particular raise manufacturing costs.

BRIEF DESCRIPTION OF THE INVENTION

An electronic device and a method are provided now, by which drawbacks of the above-mentioned problems can be reduced. Devices and methods are described as various aspects of the invention, and they are characterized by what is stated in the independent claims. Embodiments of the invention are set forth in the dependent claims.

One aspect of the invention is that an electronic device comprises at least a first part of a housing and a second part of a housing which parts of a housing are joined together with a fixing element and configured to be movable with respect to each other, wherein the first part of a housing comprises a first battery configured to provide power to functional elements comprised by the first part of a housing, and the second part of a housing comprises at least a second battery configured to provide power to functional elements comprised by the second part of a housing.

Furthermore, an idea of an embodiment of the invention is that the fixing element is a hinge joint.

The idea of a second embodiment of the invention is that the fixing element is a slide mechanism.

The idea of a third embodiment of the invention is that the second part of a housing comprises a display element.

The idea of a fourth embodiment of the invention is further that at least one of the parts of a housing comprises means for charging configured to receive power when the device is being charged.

The idea of a fifth embodiment of the invention is further that the electronic device further comprises means for transmitting power from the means for charging to the first and the second batteries.

The idea of a sixth embodiment of the invention is that the means for transmitting power further comprise means for induction.

The idea of a seventh embodiment of the invention is that the electronic device further comprises means for indicating a charge level of at least one of the batteries.

The idea of an eighth embodiment of the invention is that the means for indicating a charge level are configured to indicate a charge level of a battery with lower charge.

The idea of a ninth embodiment of the invention is that the electronic device further comprises means for wireless data transfer configured to transmit data at least in one direction between the first and the second parts of a housing.

The invention further relates to a method for managing power distribution in an electronic device comprising at least a first part of a housing and a second part of a housing joined together with a fixing element and configured to be movable with respect to each other, wherein the first part of a housing comprises a first battery, and the second part of a housing comprises a second battery, the method comprising providing power from the first battery to functional elements comprised by the first part of a housing and from the second battery to the functional elements comprised by the second part of a housing.

The electronic device and the method of the invention provide significant advantages. One advantage is that power distribution is easier to manage and more power may be provided to the part of a housing, which comprises, for example, a display. Furthermore, remarkable power savings can be achieved due to the lower number of necessary components and shorter wires. Another advantage is that the structure of the fixing element between the parts of a housing is simpler. Thus, the reliability of the device is improved. Additionally, one advantage is that heat generated by several batteries can be removed more easily, because two batteries comprise more surfaces for removing the heat than one battery of the same size with these two batteries. Furthermore, one advantage is that voltage variation in the device is small and thus, various non-cellular modules can be moved more easily from one part of a housing to another part of the housing of the device. Additionally, one advantage is that two smaller batteries are easier to implement in the device than one larger battery. Furthermore, the total capacity of two smaller batteries may be higher than that of one larger battery. One advantage is that the arrangement is relatively easy and inexpensive to implement due to the electrical connectors in the fixing element as well as due to the fact that no large number of filters and large capacitors used for balancing the voltage is needed. Additionally, one advantage is that power transfer based on induction is very robust, and thus, it improves the reliability of the device. Yet another advantage is that the structure can be implemented in such a way that dust and damp do not reach the power transfer elements very easily.

BRIEF DESCRIPTION OF THE DRAWINGS

The invention is now described in greater detail by means of preferred embodiments and with reference to the attached drawings, in which.

For the sake of clarity, the figures show the invention in a simplified manner. Like reference numbers identify like elements.

DETAILED DESCRIPTION OF THE INVENTION

Figure 1:
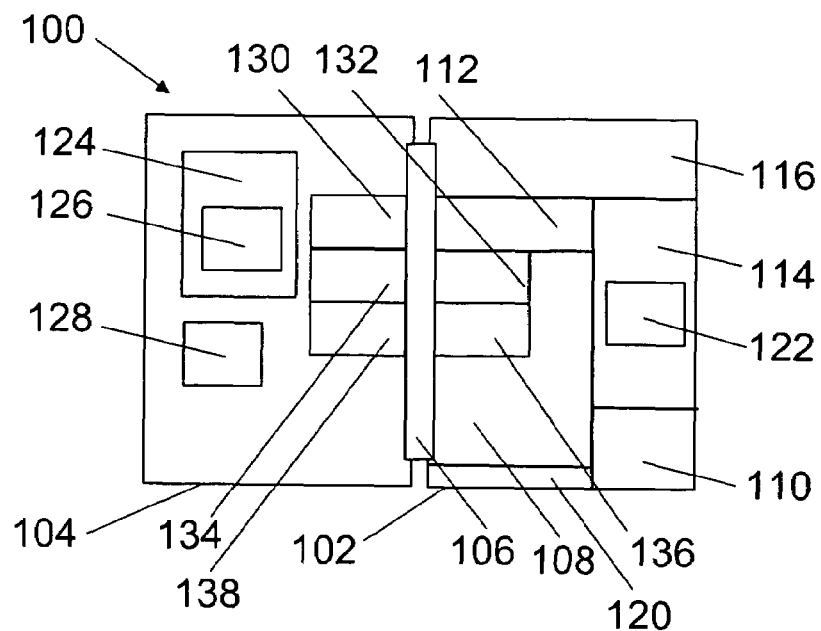
FIG. 1 shows a schematic view of an embodiment of an electronic device according to the invention.

FIG. 1 is a schematic view of an embodiment of an electronic device 100 according to the invention. The electronic device 100 may be, for example, a mobile phone, a communicator, a laptop or a PDA device (Personal Digital Assistant device). The electronic device 100 comprises a first part 102 of a housing and a second part 104 of a housing joined together with a hinge joint 106 and configured to be movable with respect to each other.

The first part 102 of a housing comprises a central processing unit 108 comprising one or more processors, a memory 110, an input/output system 114, a receiver-transmitter configured to receive and transmit data according to various data transfer protocols, a first battery 112 and means 120 for charging.

Necessary data is saved in the memory 110, which typically comprises a read memory, such as ROM (Read Only Memory) for saving applications used for controlling a central processor unit and other data to be saved, and a write memory, such as RAM (Random Access Memory) and/or FLASH memory for processing temporary data. The electronic device 100 communicates outwards, for example with other mobile devices, a net and a user, via the input/output system 114. A user interface 122, which is part of the input/output system 114, may comprise, for example, an interface, such as a keyboard, a loudspeaker and a microphone, via which the electronic device 100 and its user can communicate with each other. Data from the various components can be transmitted to the central processor unit 108, which further processes the data.

The second part 104 of a housing comprises a second input/output system 124, which comprises a display element 126 as a user interface, a second receiver-transmitter 128 and a second battery 130. The receiver-transmitters 116, 128 are configured to transmit data wirelessly between the parts 102, 104 of a housing.

The first part 102 of a housing further comprises first means for transmitting power 132, and the second part 104 of a housing further comprises second means for transmitting power 134 from the means for charging 120 to the first and the second batteries 112, 130. Thus, the means for charging 120 are connected to the first means for transmitting power 132 which, in turn, are connected to the first battery 112. The second means for transmitting power 134 are connected to the second battery 130. The power transmission may be carried out inductively between first means for induction 136 comprised by the first part 102 of a housing and second means 138 for induction comprised by the second part 104 of a housing.

Figure 2:
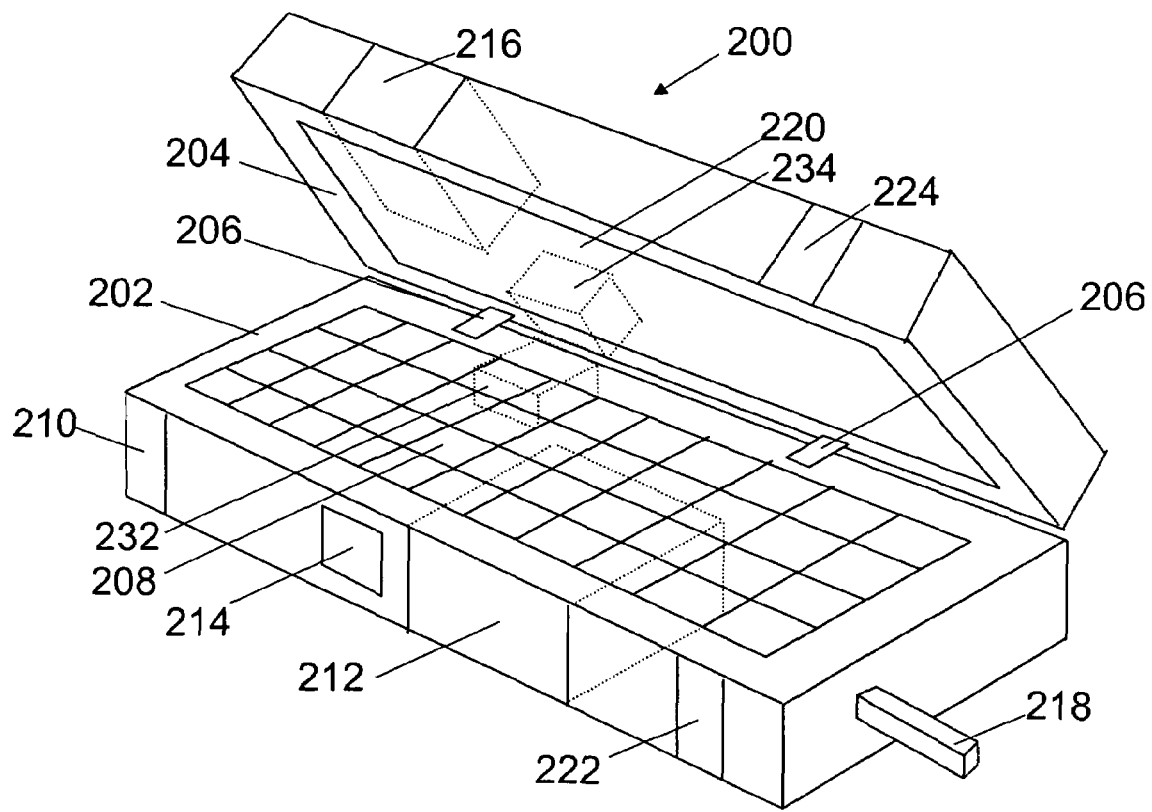
FIG. 2 shows a schematic view of an embodiment of a communicator of the invention.

FIG. 2 describes a communicator 200 according to an embodiment of the invention. The communicator 200 comprises a first part 202 of a housing and a second part 204 of a housing joined together with hinge joints 206 and configured to be movable with respect to each other.

Figure 3:
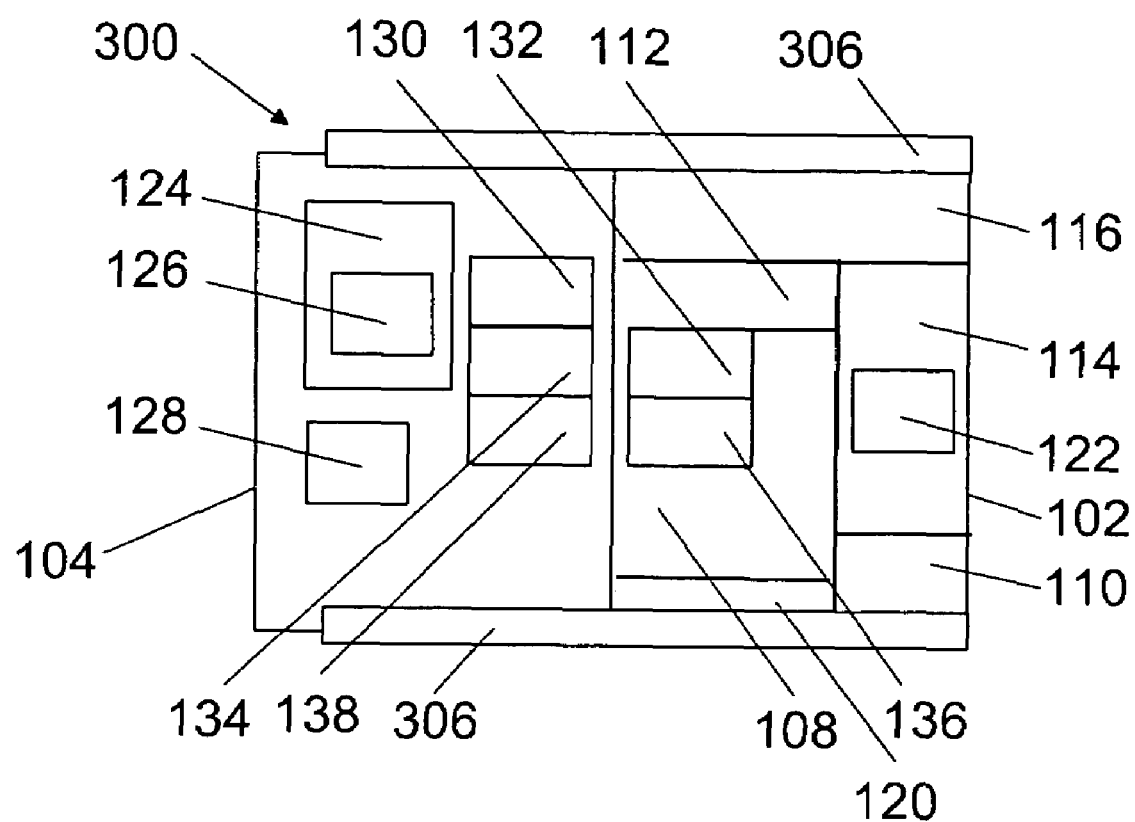
FIG. 3 shows a schematic view of an embodiment of an electronic device according to the invention.

It should be noted that the functional elements described here are not limited to be located in the parts of a housing as shown in FIGS. 1, 2 and 3, but their location may vary between the parts of a housing.

The first part 202 of a housing comprises a keyboard 208, means 210 for charging configured to receive power when the device is being charged, first means for transmitting power 232, a first battery 212 configured to provide power to functional elements comprised by the first part 202 of a housing and, an indicator 214 configured to indicate the charge level of at least one of the batteries 212, 216, preferably of a battery with lower charge. The indicator 214 may be, for example, a small LCD-display or a LED (Light Emitting Diode). The antenna 218 is located in the first part 202 of a housing with the main part of the functional elements, but it may also be located in the second part 204 of a housing.

The second part 204 of a housing comprises a display element 220, a second battery 216 configured to provide power to the functional elements comprised by the second part 204 of a housing, second means for transmitting power 234 from the means 210 for charging the second battery 216. The power may be transmitted inductively from the means for charging 210 located in the first part 202 of a housing via the first means for transmitting power 232 to the second means for transmitting power 234 which, in turn, are configured to transmit the power to the second battery 216. Thus, both batteries 212, 216 are charged through the means for charging 210. The size of the batteries preferably depends on the need of the power of the first and the second parts of a housing such that the part of a housing using more power comprises the battery, which can be further charged.

The communicator 200 further comprises means for wireless data transfer 222, 224 for transmitting data at least in one direction between the first 202 and the second 204 parts of a housing, and preferably in both directions. Data may be transferred, for example, by modulating the amplitude of the signal to be inputted to a primary coil and by modulating the impedance of the circuit of the secondary coil. The impedance causes a change in the load in the circuit of the primary coil. The change is then interpreted to a binary code. Alternatively, the data transfer may be performed optically by transferring signals in a form of light along optical fibres or another optical element, which makes bi-directional, exact and fast data transfer possible. The parts of a housing may also comprise Bluetooth transmitter-receivers, a Bluetooth connection being established therebetween or the transfer may be performed by using some other technology based on the use of radio frequency. The data transfer can also be implemented in other ways not mentioned here.

FIG. 3 describes an electronic device 300 similar to the electronic device shown in FIG. 1 but comprising a slide mechanism 306 instead of hinge joints 106 as a fixing element.

It is obvious to a person skilled in the art that as technology advances, the basic idea of the invention can be implemented in many different ways. The invention and its embodiments are thus not restricted to the examples described above, but can vary within the scope of the claims.

What is claimed is:

1. An electronic device comprising at least a first part of a housing and a second part of a housing joined together with a fixing element and configured to be movable with respect to each other, wherein said first part of a housing comprises a first battery configured to provide power to functional elements comprised by the first part of a housing, and said second part of a housing comprises a second battery configured to provide power to functional elements comprised by the second part of a housing, wherein at least one of the first and second parts of the housing includes a charger for charging the battery of that part of the housing and that part of the housing includes a power transmitter for transmitting power to the other battery inductively, where the batteries provide power to their respective housing parts.

2. An electronic device as claimed in claim 1, wherein the fixing element is a hinge joint.

3. An electronic device as claimed in claim 1, wherein the fixing element is a slide mechanism.

4. An electronic device as claimed in claim 1, wherein the second part of a housing comprises a display element.

5. An electronic device as claimed in claim 1, wherein the electronic device further comprises an indicator for indicating a charge level of at least one of the batteries.

6. An electronic device as claimed in claim 5, wherein the indicator is configured to indicate a charge level of a battery with lower charge.

7. An electronic device as claimed in claim 1, wherein the electronic device further comprises a transmitter for wireless data transfer configured to transmit data at least in one direction between the first and the second parts of a housing.

8. An electronic device as claimed in claim 1, wherein the electronic device is one of the following:
   a mobile phone
   a communicator
   a PDA device
   a laptop.

9. An electronic device comprising at least a first part of a housing and a second part of a housing joined together with a fixing element and configured to be movable with respect to each other, wherein said first part of a housing comprises a first battery configured to provide power to functional elements comprised by the first part of a housing, and said second part of a housing comprises at least a display element and a second battery configured to provide power to functional elements comprised by the second part of a housing, and at least one of the parts of the housing comprises means for charging configured to receive power when the device is being charged, wherein the at least one part of the housing including means for charging includes means for transmitting power to the other part of the housing inductively, where the batteries provide power to their respective housing parts.

10. A method for managing power distribution in an electronic device comprising at least a first part of a housing and a second part of a housing joined together with a fixing element and configured to be movable with respect to each other, wherein the first part of a housing comprises a first battery, and the second part of a housing comprises a second battery, the method comprising providing power from the first battery to functional elements comprised by the first part of a housing and from the second battery to functional elements comprised by the second part of a housing; receiving power in one of the first and second batteries when the device is being charged; and inductively transmitting power from the battery receiving the power to the other battery.

11. A method as claimed in claim 10, the method further comprising indicating a charge level of at least one of the batteries.

12. A method as claimed in claim 10, the method further comprising indicating a charge level of a battery with lower charge.

13. A method as claimed in claim 10, the method further comprising transmitting data wirelessly at least in one direction between the first and the second parts of a housing.

14. A method for managing power distribution in an electronic device comprising at least a first part of a housing and a second part of a housing joined together with a fixing element and configured to be movable with respect to each other, wherein the first part of a housing comprises a first battery, and the second part of a housing comprises a display element and a second battery, wherein at least one of the parts of the housing comprises means for charging, the method comprising providing power from the first battery to functional elements comprised by the first part of a housing and from the second battery to functional elements comprised by the second part of a housing, receiving power when the device is being charged, and inductively transmitting power from the means for charging to the part of the housing not comprising the means for charging.

\* \* \* \* \*